(12) United States Patent
Chapman et al.

(10) Patent No.: US 6,963,973 B2
(45) Date of Patent: Nov. 8, 2005

(54) CHAIN OF CUSTODY SYSTEM AND METHOD

(75) Inventors: Charles B. Chapman, Escondido, CA (US); Winthrop D. Childers, San Diego, CA (US); Jerry R. Potts, Escondido, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 912 days.

(21) Appl. No.: 09/981,779

(22) Filed: Oct. 17, 2001

(65) Prior Publication Data

US 2003/0074556 A1 Apr. 17, 2003

(51) Int. Cl.[7] .............................................. G06F 17/00
(52) U.S. Cl. ...................... 713/168; 713/175; 713/176
(58) Field of Search ............................... 713/168–176, 713/200–202, 150

(56) References Cited

U.S. PATENT DOCUMENTS

| | | | |
|---|---|---|---|
| 4,453,074 A | 6/1984 | Weinstein | |
| 4,670,857 A | 6/1987 | Rackman | |
| 4,714,962 A | 12/1987 | Levine | |
| 4,776,013 A | 10/1988 | Kafri et al. | |
| 4,786,940 A | 11/1988 | Daniele | |
| 4,835,563 A | 5/1989 | Larish | |
| 4,853,733 A | 8/1989 | Watanabe et al. | |
| 4,853,961 A | 8/1989 | Pastor | |
| 4,879,747 A | 11/1989 | Leighton et al. | |
| 5,027,401 A | 6/1991 | Soltesz | |
| 5,036,344 A | 7/1991 | Inoue et al. | |
| 5,138,459 A | 8/1992 | Roberts et al. | |
| 5,159,630 A | 10/1992 | Tseng et al. | |
| 5,164,836 A | 11/1992 | Jackson et al. | |
| 5,184,169 A | 2/1993 | Nishitani | |
| 5,198,851 A | 3/1993 | Ogawa | |
| 5,204,901 A | 4/1993 | Hershey et al. | |
| 5,231,501 A | 7/1993 | Sakai | |
| 5,233,653 A | 8/1993 | Katsurabayashi | |
| 5,260,735 A | 11/1993 | Ishikawa et al. | |
| 5,260,795 A | 11/1993 | Sakai et al. | |
| 5,272,025 A | 12/1993 | Wheeler | |
| 5,297,202 A | 3/1994 | Kapp et al. | |

(Continued)

FOREIGN PATENT DOCUMENTS

WO   WO 00/76171   12/2000

(Continued)

OTHER PUBLICATIONS

A multi-protocol cryptographic framework for the authentication of digital streams Goh, A.; Poh, G.S.; TENCON 2000. Proceedings , vol.: 3 , Sep. 24-27, 2000.*

(Continued)

*Primary Examiner*—David Jung
(74) *Attorney, Agent, or Firm*—Jerry R. Potts

(57) ABSTRACT

An unimpeachable chain of custody system and method includes a confirmation authentication system that facilitates receiving and storing a communication signal that is indicative of an evidentiary item captured at a determined location and at a determined time. The confirmation authentication system and method further facilitates generating and transmitting a chain of custody confirmation signal to a transportable input system that the communication signal has been authenticated and stored for subsequent retrieval. The transportable input system includes a positioning device and a communication device that cooperate to facilitates generating and transmitting the communication signal in response to receiving the chain of custody confirmation signal. The transportable input system further facilitates generating an authentication signal that the communication signal was generated by the input system at about the determined location and at about the determined time so that the integrity of the received evidentiary item cannot be impeached.

14 Claims, 10 Drawing Sheets

U.S. PATENT DOCUMENTS

| | | |
|---|---|---|
| 5,301,044 A | 4/1994 | Wright |
| 5,303,050 A | 4/1994 | Nishimura et al. |
| 5,303,370 A | 4/1994 | Brosh et al. |
| 5,307,100 A | 4/1994 | Kubo |
| 5,321,749 A | 6/1994 | Virga |
| 5,337,362 A | 8/1994 | Gormish et al. |
| 5,383,027 A | 1/1995 | Harvey et al. |
| 5,384,846 A | 1/1995 | Berson et al. |
| 5,389,989 A | 2/1995 | Hawkins et al. |
| 5,404,463 A | 4/1995 | McGarvey |
| 5,410,642 A | 4/1995 | Hakamatsuka et al. |
| 5,416,510 A | 5/1995 | Lipton et al. |
| 5,420,924 A | 5/1995 | Berson et al. |
| 5,430,525 A | 7/1995 | Ohta et al. |
| 5,468,581 A | 11/1995 | Coe et al. |
| 5,485,285 A | 1/1996 | Shono et al. |
| 5,499,294 A | 3/1996 | Friedman |
| 5,543,885 A | 8/1996 | Yamano et al. |
| 5,581,613 A | 12/1996 | Nagashima et al. |
| 5,719,939 A | 2/1998 | Tel |
| 5,751,809 A | 5/1998 | Davis |
| 5,764,770 A | 6/1998 | Schipper et al. |
| 5,799,082 A | 8/1998 | Murphy et al. |
| 5,815,093 A | 9/1998 | Kikinis |
| 5,862,217 A | 1/1999 | Steinberg et al. |
| 5,862,218 A | 1/1999 | Steinberg |
| 5,987,155 A | 11/1999 | Dunn et al. |
| 6,006,039 A | 12/1999 | Steinbeg et al. |
| 6,163,361 A | 12/2000 | McIntyre et al. |

FOREIGN PATENT DOCUMENTS

| | | |
|---|---|---|
| WO | WO 02/37375 | 5/2002 |

OTHER PUBLICATIONS

Efficient multicast source authentication using layered hash-chaining scheme Challal, Y.; Bouabdallah, A.; Hinard, Y.; Local Computer Networks, 2004. 29th Annual IEEE International Conference on , Nov. 16-18, 2004.*

Short-delay playback and high reliability content delivery through chain-casting Utahara, T.; Communications, 2003. APCC 2003. The 9th Asia-Pacific Conference on , vol.: 2 , Sep. 21-24, 2003.*

Kelsey et al. "An Authenticated Camera".

\* cited by examiner

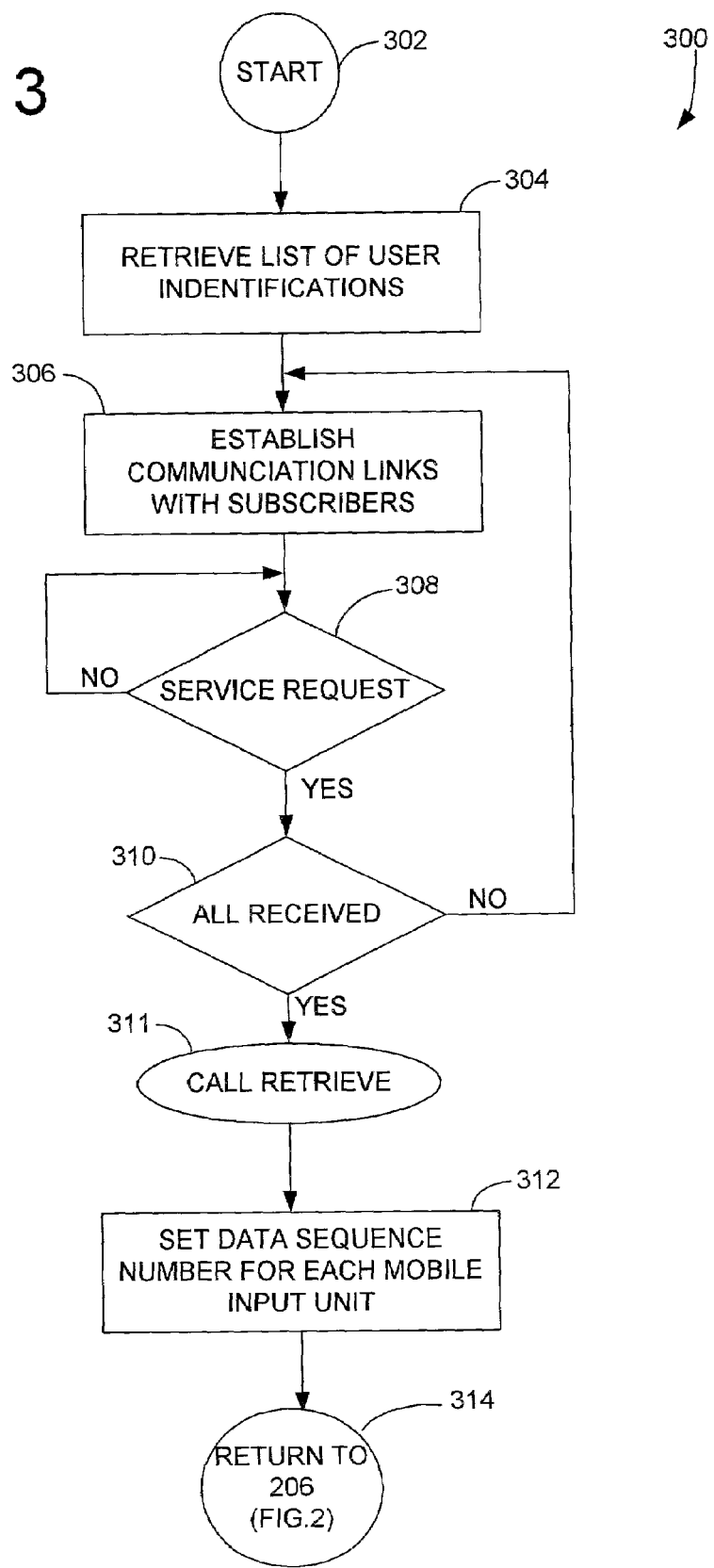

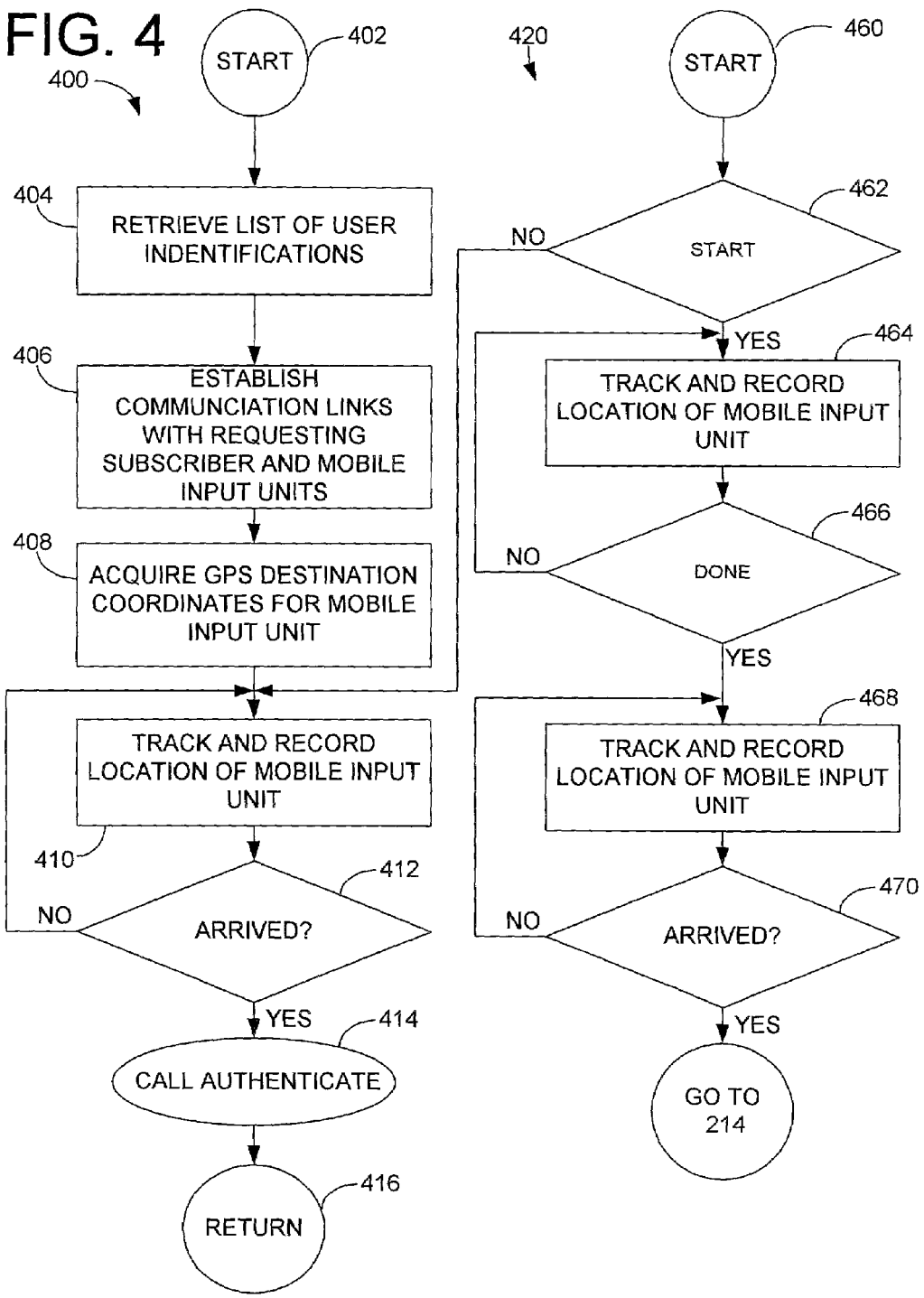

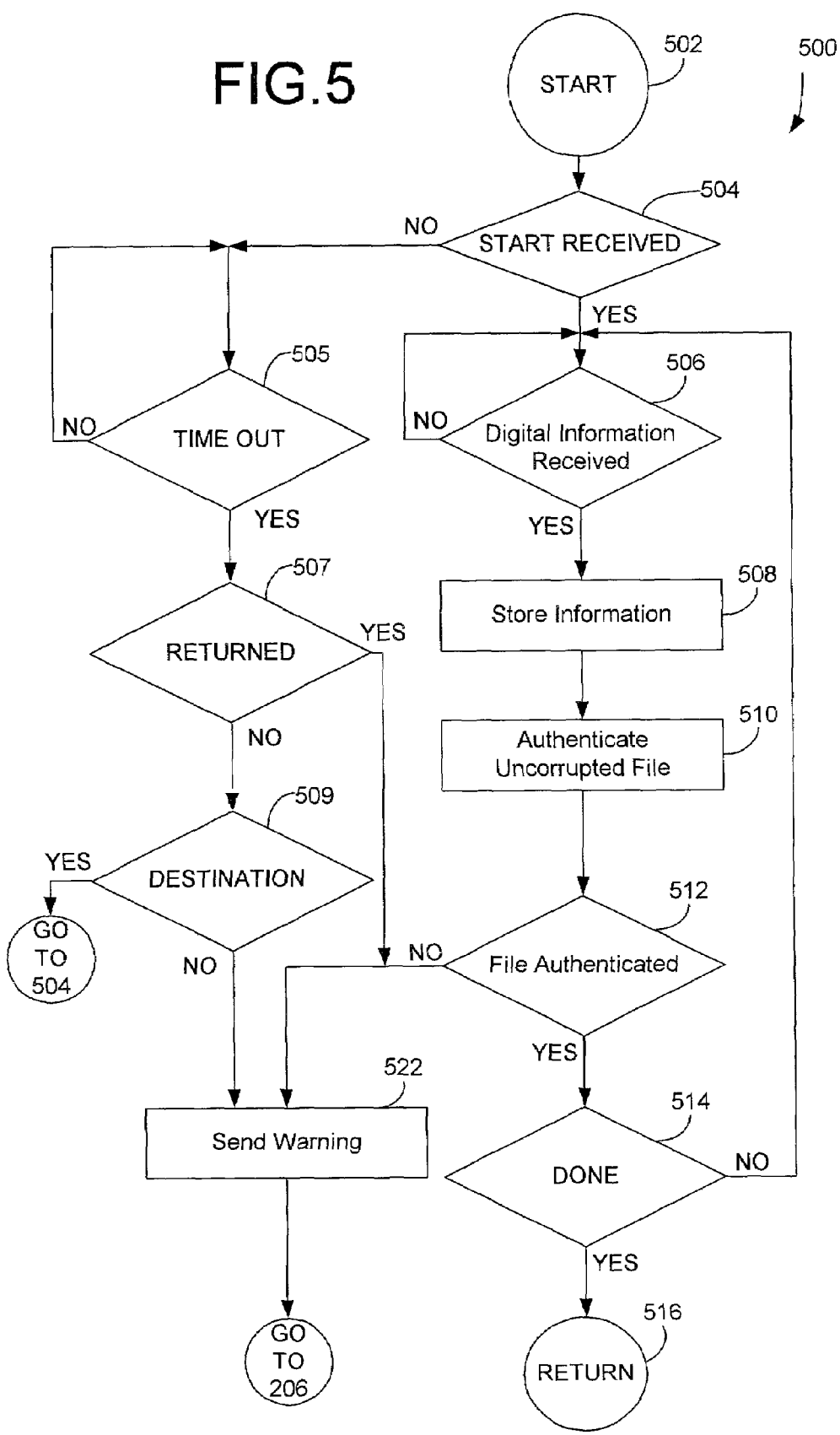

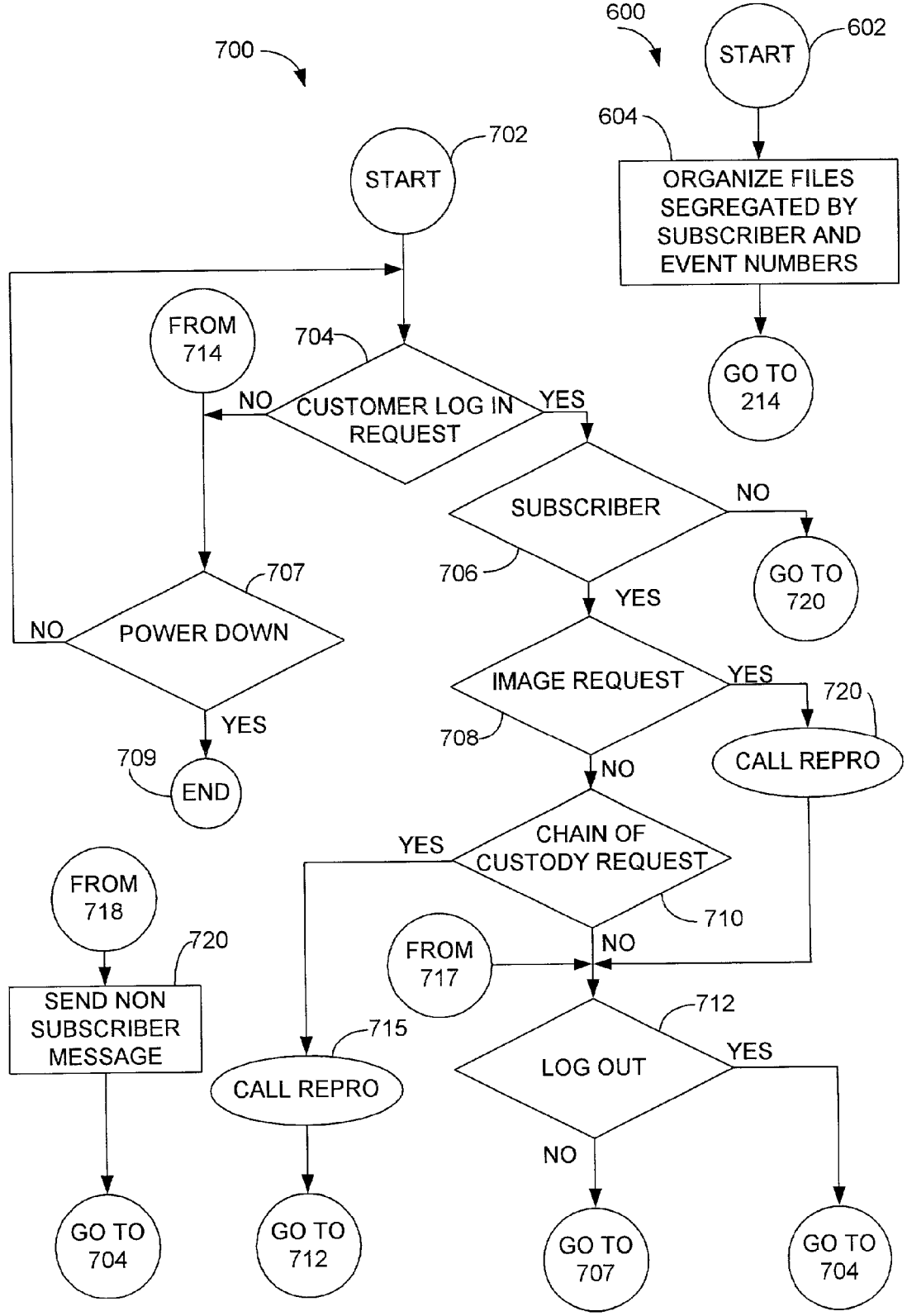

CHAIN OF CUSTODY SYSTEM AND METHOD

I. BACKGROUND OF THE INVENTION

A. Field of the Invention

The present invention relates to a system and method of capturing and storing an object for subsequent retrieval. More particularly, the system and method enabling the authentication of an original digital asset so that the integrity and chain of custody of the file information cannot be impeached.

B. Description of Related Art

There have been many systems and methods relating to the authentication of a generated signal and to ensuring the integrity of such a signal during its transmission. For example, reference may be made to the following U.S. Pat. Nos.: 4,042,960; 4,383,743; 4,992,868; 5,499,294; 5,751,809; 5,764,770; 5,799,082; 5,852,502; 5,862,217; 5,862,218; 5,870,471; 5,898,799; 5,987,136; 5,995,638; 6,005,936; 6,078,848; 6,163,361; and 6,167,459.

While such systems and methods have been satisfactory for certain applications, they have not always proven to be entirely reliable. Therefore, there is a need for a new and improved system and method that enables the authentication of an original digital file so the integrity and chain of custody of the file information cannot be impeached.

II. SUMMARY OF THE INVENTION

The objects and features of the present invention are realized by providing an unimpeachable chain of custody system and method that includes a confirmation authentication system to facilitate receiving and storing a communication signal that is indicative of an evidentiary item captured at a determined location, and at a determined time. The confirmation authentication system and chain of custody method further facilitate the generating and transmitting of a chain of custody confirmation signal to a transportable input system that the communication signal has been authenticated and stored for subsequent retrieval. The transportable input system includes a positioning device and a communication means that cooperate to facilitate generating and transmitting the communication signal in response to receiving the chain of custody confirmation signal. The transportable input system further facilitates generating an authentication signal that the communication signal was generated by the input system at about the determined location and at about the determined time so that the integrity of the received evidentiary item cannot be impeached.

III. BRIEF DESCRIPTION OF THE DRAWINGS

The above-mentioned features of this invention and the manner of attaining them will become apparent, and the invention itself will be best understood by reference to the following description of the embodiment of the invention in conjunction with the accompanying drawings wherein:

FIG. 3 is a high-level flow chart of an initialize subroutine executed during the chain of custody method of FIG. 2;

FIG. 4 is a high-level flow chart of a set up tracking subroutine executed during the chain of custody method of FIG. 2;

FIG. 5 is a high-level flow chart of a capture subroutine executed during the chain of custody method of FIG. 2;

FIG. 6 is a high-level flow chart of an organize subroutine executed during the chain of custody method of FIG. 2;

FIG. 7 is a high-level flow chart of a retrieve subroutine executed whenever a client subscriber desires to retrieve chain of custody information stored in the chain of custody system of FIG. 1;

IV. DETAILED DESCRIPTION OF THE INVENTION

Figure 1:
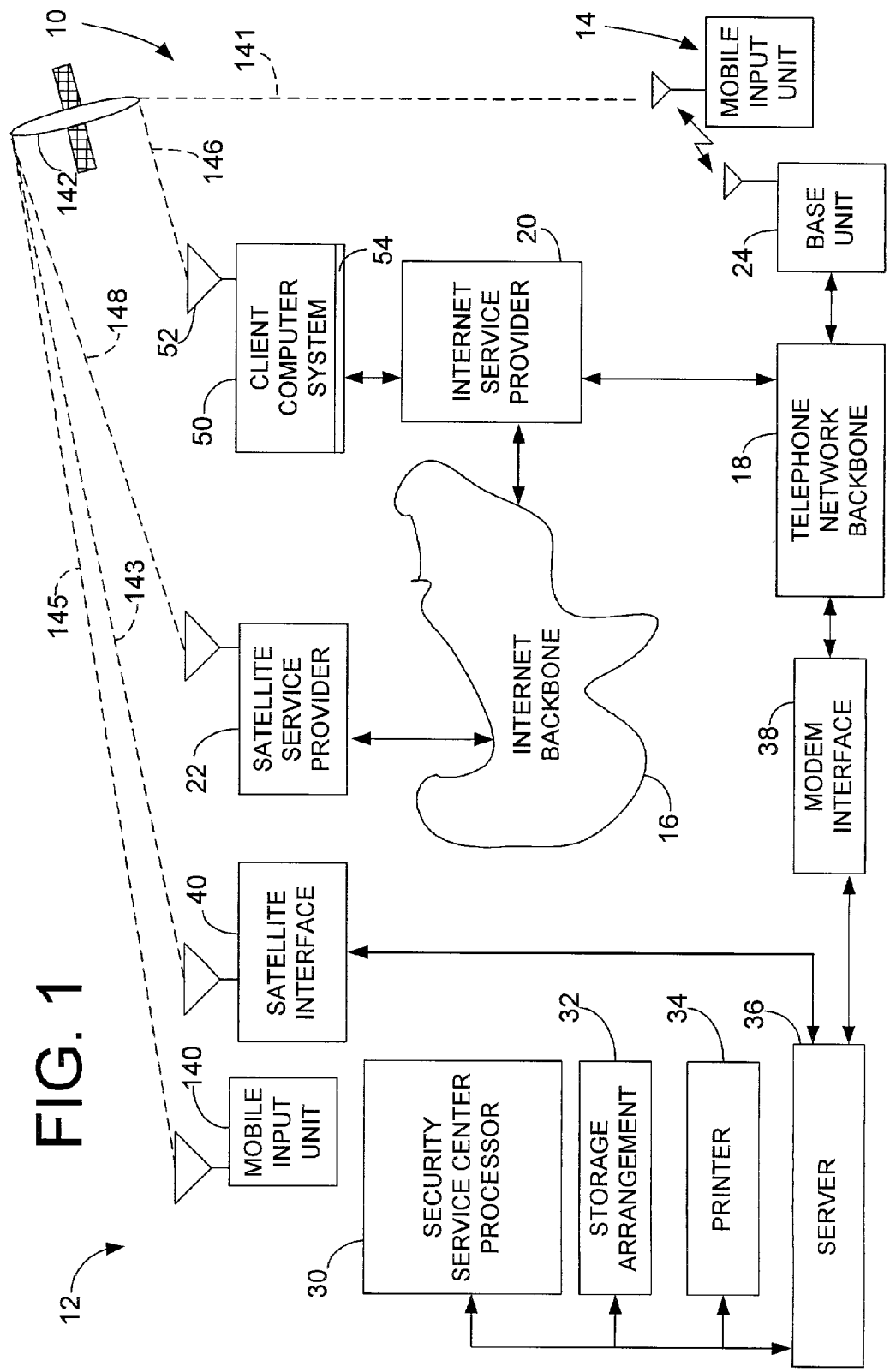
FIG. 1 is a block diagram of a chain of custody system that is constructed in accordance with the present invention.

Referring now to the drawings and more particularly to FIG. 1 thereof, there is illustrated a chain of custody system 10, which is constructed in accordance to the present invention. The chain of custody system 10 and a unique and novel chain of custody method 100 provides law enforcement agencies, investigators and the like with authentication of an original digital file so the integrity and chain of custody of the file information is completely immune from impeachment or is at least substantially immune from impeachment.

Considering now the chain of custody system 10 in greater detail with reference to FIG. 1, the chain of custody system 10 generally includes a confirmation authentication system 12 and a plurality of transportable or mobile input units, such as a mobile unit 14 and a mobile input unit 140. The mobile input units 14 and 140 are assigned to a client that desires a chain of custody processing service. In this regard, the chain of custody method 100 not only provides law enforcement agencies, private investigators, attorneys, journalists, business persons and other members of the general public corroboration that a particular evidentiary object acquired at a remote site is authentic, but also the chain of custody method 100 provides, in a cost-effective manner, a chain of custody record that is completely immune from impeachment or that is at least substantially immune from impeachment.

The preferred embodiment of the method 100 of the invention is performed partially in the confirmation authentication system 12 and partially in a mobile input unit utilized by the client to capture an evidentiary object. In this regard, the confirmation authentication system 12 facilitates receiving and storing a communication signal generated by a mobile input unit, such as the mobile input units 14 and 140. The communication signal generated by the client assigned mobile input unit is indicative of an evidentiary item that has been captured at a determined location and at a determined time from a remote field location. The confirmation authentication system 12 further facilitates generating and transmitting a custody confirmation signal that provides an immediate indication to a field investigator that the earlier mentioned communication signal generated by the mobile input unit 14 was received, authenticated and stored for subsequent retrieval. More particularly, the custody confirmation signal is a verification that the chain of custody for the evidentiary item has been transferred from the remote field location to a secure server that ensures the evidentiary item has not been tampered with or altered since it was received and stored within the confirmation authentication system 12. The confirmation authentication system 12 also generates another custody confirmation signal that verifies the assigned mobile input unit was tracked during a given time frame from a predetermined location to the remote location where the communication signal was generated at the determined location and at the determined time. The custody confirmation signal and the another custody confirmation signal provide the necessary corroboration to assure the captured object is unimpeachable or is at least substantially unimpeachable. In short then, the custody confirmation signals provide verification that the communication signal was received from the assigned mobile input unit 14, whose location was independently tracked by the confirmation authentication system 12.

As will be explained hereinafter in greater detail, during the intended use of an assigned mobile input, such as the mobile input unit 14, the authentication confirmation system 12 establishes a chain of custody record by: a) tracking the location of the mobile input unit 14 from a designated client location to a designated remote location; b) recording the date and time the mobile input unit 14 was utilized; and c) recording the identity of the person or device in custody of the mobile input unit 14.

To facilitate the establishing of multiple communication paths between the client, the mobile input units 14, 140 and the authentication confirmation system 12, the client includes a conventional computer system 50 that is coupled to an Internet Service Provider (ISP) as well as a Satellite Service Provider (SSP), where the ISP and the SSP are indicated generally at 20 and 22 respectively. The client computer system 50 includes a satellite interface, indicated generally at 52 and a modem interface, indicated generally at 54.

While in the preferred embodiment of the invention, communication between the confirmation authentication system 12 and the mobile input unit 14 is described as a wireless communication unit using a secure Internet connection. It is contemplated however, that those of ordinary skill in the art could practice this method in a wide variety of other communication methods. Therefore, this patent should not be read to be limited to the specific embodiment of the described system and method as other communication methods and confirmation authentication systems could easily be substituted by those of ordinary skill in the art without departing from the essence of this invention. Thus, for example, the mobile input unit 140 is a satellite communication unit using a secure satellite connection. Similarly, the preferred embodiment, described in the following detailed description, includes a number of components and method steps which may not be absolutely necessary in other embodiments of the invention. Therefore those absolutely necessary in other embodiments of the invention. Therefore those reading and understanding this patent are directed to the claims for a description of the range of the claimed subject matter of this invention.

Considering now the confirmation authentication system 12 in greater detail with reference to FIG. 1, the confirmation authentication system 12 generally includes a security service center processor 30, a storage arrangement 32, a printer 34, and a server 36. The security service center processor 30 is shown in communication with one or more of the mobile or transportable input units, such as the transportable input units 14 and 140. The transportable input units 14 and the transportable input 140 provide two different levels of security relative to information received by the security service center processor 30 as will be explained hereinafter in greater detail. For the moment it will suffice to indicate that the transportable input system 14 utilizes a secure Internet communication path, while the transportable input system 140 utilizes a satellite communication path.

In order to establish the Internet communication path between the confirmation authentication system 12 and the mobile input unit 14, the confirmation authentication system 12 further includes a modem interface 38 that is coupled between the server 36, and a conventional telephone network backbone indicated generally at 18. In a similar manner, in order to establish the satellite communication path between the confirmation authentication system 12 and the mobile input unit 140, the confirmation authentication system 12 also includes a satellite interface indicated generally at 40. The satellite interface 40 is coupled between the SSP 22 (via one or more geosynchronous satellites, such as a geosynchronous satellite 142) and the server 36. As best seen in FIG. 1, the SSP 22 is also coupled to the ISP 20 via the Internet backbone indicated generally at 16.

From the foregoing, those skilled in the art should be able to understand that the mobile input unit 14 is in communication with the confirmation authentication system 12 via either an Internet communication path, such as through a remote cellular base unit 24, the Internet backbone 16, the telephone network backbone 18, the ISP 20, and the modem interface 38, or a satellite communication path such as through the satellite 142, and the satellite interface 40. Those skilled in the art will further appreciate that a combination Internet/satellite combination path is also available between the mobile input units 14 and 140 and either the confirmation authentication system 12 or the client computer system 50 via the satellite 142, since the satellite 142 is able to receive digital information from the satellite service provider 22 via an uplink indicated generally at 148, which digital information is received by the satellite receiver 144 or the satellite receiver 52 from the downlinks indicated generally at 143 and 146 respectively. The use of such a satellite communication channel is a particularly useful feature when communicating from remote locations where wireless communication via the Internet backbone 18 and telephone network 22 is otherwise unavailable. Thus, for example, combination uplinks and downlinks 141 and 145 from the mobile input units 14 and 140 respectively, enable the confirmation authentication system 12 to maintain satellite communication with the mobile units 14 and 140 regardless of location.

Figure 2:
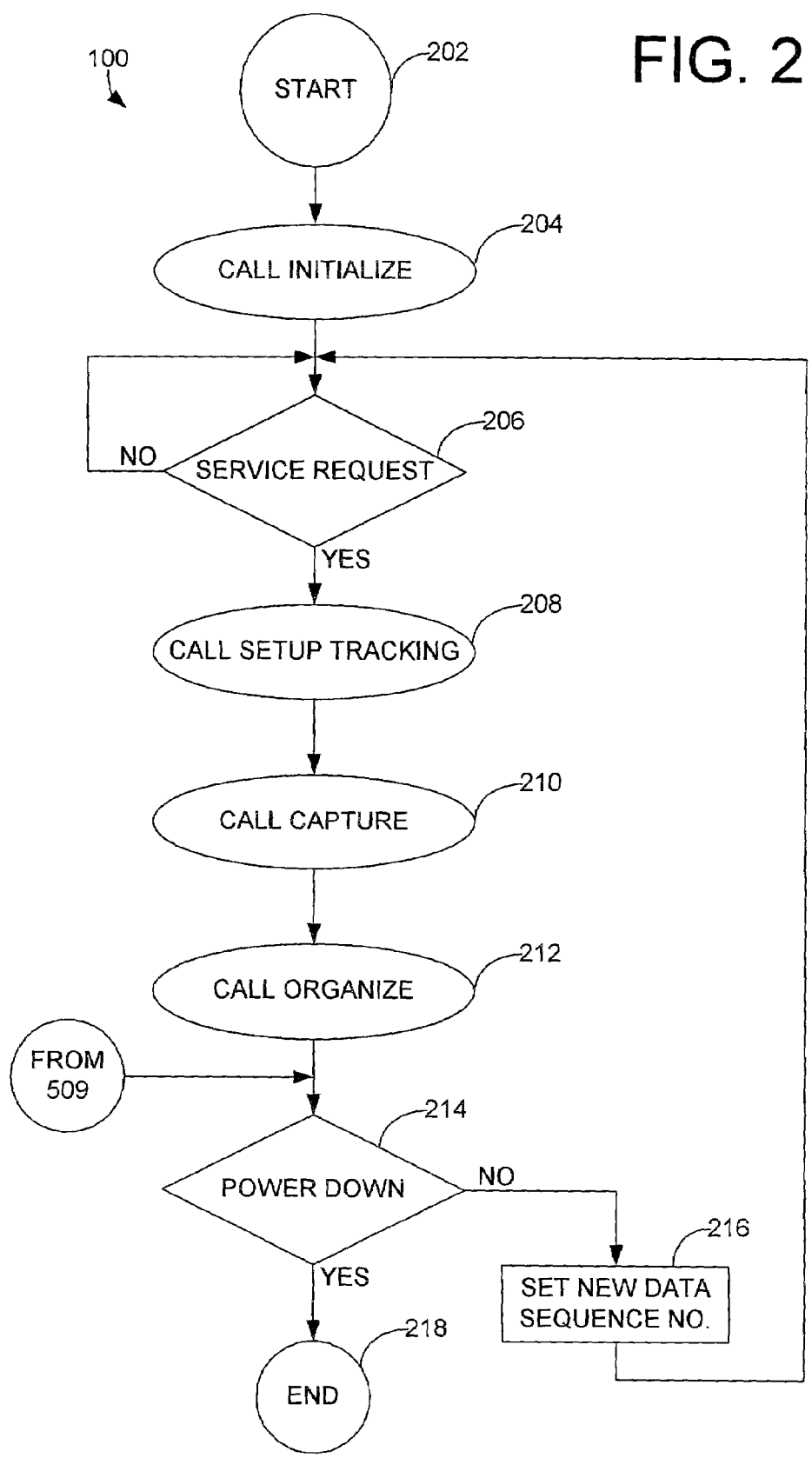
FIG. 2 is a high-level flow chart of the chain of custody method enabled by the chain of custody system of FIG. 1.

Considering now the operation of the chain of custody system 10 in greater detail with reference to FIGS. 1 and 2, the chain of custody method 100 begins at a start command 202 at the start of a sequence of work. In this regard, when power is first applied to the chain of custody system 10, the chain of custody method 100 generates the start command 202 and then advances to a call initialize command 204 that causes an initialize subroutine 300 (FIG. 3) to be executed. After the initialize subroutine 300 has been executed, the program proceeds to a query command 206 and waits for a service request to be received from a subscriber client via the client computer system 50. Such a client subscriber service request can be received either from a satellite communication through the satellite interface 40 or from an Internet request via the modem interface 38 depending upon the communication channel selected by the subscriber client. It should also be noted that a non-client service request could also be generated by the system itself in order to permit acquired information to be backed up in memory.

The chain of custody request generated by the client computer system 50 provides the security service center processor 30 with mobile input unit user information (such as the name, address, employee identification number, social security number, date of birth, etc. of the person utilizing an assigned mobile input unit, such as the mobile input unit 14) along with the longitude, latitude coordinate information that the user will be transporting the mobile input unit 14. Such coordinate information is provided to the client computer system 50 using acquired GPS signals from means not shown, such as a GPS enabled police unit that has arrived at the scene of a crime, a cell phone locating system, or any other locating system that can acquire or determine longitude, latitude coordinate information.

When the security service center processor 30 receives the chain of custody request, the method 100 advances from the query command 206 to a call tracking command 208 that causes a setup tracking subroutine 400 to be executed. As will be explained hereinafter in greater detail, the setup tracking subroutine records the time the request was received, the mobile input unit user information, the departure coordination information for the location of the mobile input unit 14, the destination coordinate information and a data sequence number to the event. This information is recorded once and thereafter only the coordinate information for the mobile unit is recorded as the user transports the mobile input unit to the desired destination.

Once the mobile input unit 14 has arrived at the desired destination coordinates, the method 100 exits the setup tracking subroutine and advances to a call command 210 that causes a capture subroutine 500 (FIG. 5) to be executed. The capture subroutine 500 will be described hereinafter in greater detail. At this point it should be noted that when the user arrives at the desired destination coordinates, the user would utilize the input unit 14 to capture, annotate, encrypt and transmit object information to the chain of custody system 10 as well as the client=s computer system 50. In this manner, two independent records are created, where the original records derived at the client=s computer system 50 can be corroborated by the independent information tracked and recorded by the chain of custody system 10.

Once the input unit 14 has returned to the departure coordinates, the method 100 advances from the capture subroutine 500 to a call command 212 that initiates a organize subroutine 600 that will be described hereinafter in greater detail. It will suffice to state that at the organize subroutine 400, causes the object files obtained from the mobile input unit 14 to be organized for subsequent retrieval whenever a chain of custody record is required or whenever an authentication task is needed. The organize subroutine 600 will be described hereinafter in greater detail.

When the organize subroutine 600 has been executed, the program advances to a power down query to determine whether the system 10 has received a request to power down. If such a request has been received, the system 10 is powered down by advancing to an end command 218. Otherwise, the program advances to a command step 216 that causes a new data sequence number to be set for the client subscriber. Thereafter the method returns to the query command 206 where the method proceeds as described previously.

From the foregoing, it should be understood by those skilled in the art that an original evidence record is maintained by the client computer system 50 that can be presented in a court of law under existing rules of evidence. The independent records maintained by the chain of custody system 10 can also corroborate the original evidence records. In this regard, a user of the chain of custody service may view, download, print local or order certified or uncertified reproductions from a web site established through the chain of custody service centers.

1. The Initialize Subroutine

The initialize subroutine 300 begins whenever the initialize call command 204 is executed (FIG. 2). As will be explained hereinafter in greater detail, the initialize subroutine 300 causes the following to occur: 1) the establishment of communication links between the security service center processor 30, the client computer system 50, and the mobile input units 14 and 140 respectively; 2) using the geosynchronous satellite system (GPS), causing the security service center processor 30 to acquire time and location information for the client computer system 50, and the mobile input units 14 and 140; and 3) setting up a data sequence number for the client computer system and the mobile input units 14 and 140.

Considering now the initialize subroutine 300 in still greater detail with reference to FIG. 3, the initialize subroutine begins at a start command 302 and advances to a command step 304. The command step 304 causes the confirmation authentication system 30 to retrieve a current list of user or subscriber identification numbers. The program then advances to a command step 306 that causes communication links to be established with each of the current subscribers by sending the client=s computer system 50 an on line signal. The client=s computer system 50 responds to the on line signal by sending the confirmation authentication system 30 the current GPS coordinate location for each mobile unit that has been assigned to the user subscriber.

After sending the on line signal to the client=s computer system 50, the program advances to a query command 308 and waits for the client=s computer system 50 to respond by sending the current GPS coordinate locations for each mobile unit that has been assigned to the user subscriber. Such communications links are established via either the modem interface 38 or the satellite interface 40.

When the client computer system 50 responds, the initialize subroutine 300 advances to another query command 310 to verify that all client computer system 50 has provided all of the current coordinate information for each assigned mobile input unit. If all of the current coordinate information has not been provided the program returns to command 30 and proceeds as described previously. On the other hand, if all current coordinate information has been provided for all the assigned mobile input units, such as the mobile input units 14 and 140, the program proceeds to a call command 311 that causes a retrieve subroutine 700 (FIG.7) to be executed. The retrieve subroutine 700 will be described hereinafter in greater detail.

After the call command 311 is executed, the subroutine 300 proceeds to a command step 312 to set a data sequence number of each mobile input unit. In this manner, the mobile input units are now in a ready state and can be dispatched by a client subscriber whenever a need arises.

After executing the set data sequence command 312, the program advances to a return command step 314 that returns the program to the main chain of custody program 100 by advancing from the call command 204 to the query command 206. The chain of custody system 10 is now initialized and the confirmation authentication system 30 now waits for a service request from the client=s computer system 50. In this regard, whenever the client determines that a chain of custody record needs to be established, the client, via the client=s computer system 50, sends a chain of custody request to the security service center processor 30 via the established communication paths.

2. The Setup Tracking Subroutine

Whenever, a service request is received from the client=s computer system 50, the chain of custody method 100 advances to the call setup tracking subroutine 400 by executing a start command 402 (FIG. 4).

From the start command 402, the subroutine advances to a command step 404, which causes the list of subscribers to be retrieved from the storage arrangement 32. The subroutine then proceeds to a command step 406 that causes a communication link to be established with the requesting subscriber computer system, such as the client computer system 50 and the mobile input units assigned to the subscriber; for example, mobile units 14 and 140.

The subroutine 400 then advances to a command step 408 that causes the client=s computer system to send the GPS destination coordinates for the assigned mobile input unit 14. As noted earlier, the destination coordinates are supplied either by a satellite or Internet communication from a source not shown, such as a police unit that has arrived at the scene of a crime.

The subroutine 400 then proceeds to a command step 410 that causes the location of the mobile input unit 14 to be tracked while traveling to its destination coordinates. In this regard, a real time record of the movement of the mobile unit 14 is stored by the confirmation authentication system 30. This chain of custody record includes a data sequence number, user information, time information and GPS coordinate information that is recorded every t seconds, where t is between about 1 second and about 600 seconds.

The subroutine 400 advances from the command step 410 to a query command 412 that seeks to determine whether the mobile unit 14 has arrived at the destination coordinates. If the mobile unit 14 has not arrived at the destination coordinates within t seconds, the subroutine returns to the command step 410 and proceeds as described previously. However, should the mobile unit 14 arrive at the destination coordinates within t seconds, the subroutine advances to a call command 412 that calls an authenticate subroutine 420 that will be described hereinafter in greater detail. For the moment it will suffice to indicate that the authenticate subroutine 420 tracks the location of the mobile input unit 14 during a capture period. That is, when the user is utilizing the mobile input unit 14 to capture input information and then during a return period when the user is returning the input unit 14 to it departure location. In this manner, a complete chain of custody record is established starting from the departure location to the destination location, during the capture period, and then from the destination location to the departure location.

After the call command 414 is executed, the subroutine 400 advances to a return command 416 that returns to the chain of custody program 100 by advancing to the call capture command 210 as best seen in FIG. 2.

From the foregoing it should be understood by those skilled in the art that the chain of custody records for the mobile input unit during the capture period could be compared with the input information received from the mobile input unit 14 whenever it acquires input information. This is an important feature as this information can be utilized not only to help authenticate the input information received from the mobile input unit 14 but also to help establish the chain of a custody record.

3. The Authentication Subroutine

Considering now the authentication subroutine 420 in greater detail with reference to FIG.4, the authenticate subroutine 420 begins at a start command 460 when the call command 414 is executed. From the start command 460, the subroutine proceeds to a query command to determine whether the user of the mobile input device has sent a start command to the confirmation authentication system 30 indicating that the user is about to begin capturing object information at the destination location. If the start command has not been received, the authenticate subroutine 460 goes to command 410 to continue to track the location of the mobile input unit 14 and to verify that the mobile unit is at about the destination coordinates supplied by the client computer system 50. If a start command is received from the mobile input unit 14, the subroutine 420 proceeds to a step command 464 and begins to track and record the location of the mobile input unit 14 at the destination location while the user is using the mobile input unit 14 to capture information. In this regard the subroutine advances to a query command 466 to determine whether a done command is received from the mobile input unit 14.

If a done command is not received within t seconds, the subroutine returns to command 464 and proceeds as described previously. If a done command is received from the mobile input unit 14, indicating that the user has completed the task of capturing input information at the destination location, the subroutine proceeds to a step command 468.

The step command 468 tracks and records the location of the mobile input unit 14 from the destination location, back to the departure location. In this regard, the command 468 records the location of the mobile input unit in the storage arrangement 32 of the confirmation and authentication system 30. The subroutine 420 then advances to a query command 470 to determine whether the user has returned to the departure location of the client's computer system 50. If the mobile unit 14 has been returned to the departure location within t seconds after executing the query command 470, the subroutine 400 advances to the query command 214 and proceeds as described previously.

If the mobile unit 14 has not been returned to the departure location within t seconds after executing the query command 470, the subroutine 400 returns to the command step 468 and proceeds as described previously.

4. The Capture Subroutine

Considering now the capture subroutine 500 in greater detail with reference to FIG. 5, the capture subroutine 500 begins at a start command 502 in response to the call capture command 210 (FIG. 2). From the start command 502, the subroutine 500 proceeds to a query command 504 to determine whether the user of the input unit 14 has sent a start command to the confirmation authentication system 30. If a start command has not been received, the subroutine 500 proceeds to a time out query step 505. In this regard, if a start command is not received within T minutes from initiating the capture subroutine 500, the program advances to a query command 507 to determine whether the user has returned the mobile unit 14 to the departure location.

If the user has returned the mobile unit 14 to its departure location, the subroutine 500 advances to a send warning command 522 that will be described hereinafter in greater detail. On the other hand, if the user has not returned the mobile input unit 14 to the departure location, the subroutine 500 goes to a query command 509 to determine whether the mobile unit 14 is still at about the destination location. If the mobile unit 14 is still within τ miles of the destination location, where τ miles are between about 0.1 miles and about one mile, the subroutine 500 returns to the query command 504 and proceeds as described previously. If the mobile unit is not within the vicinity of the destination location, the subroutine 500 proceeds to the warning command step 522.

Considering again the query command 504, if a start command is received, the subroutine 500 proceeds to a query command 506 to determine whether the confirmation authentication system has received a digital information packet from the input unit 14. If a digital information packet has been received, the subroutine goes to a store command 508 that causes the confirmation authentication system 30 to store the packet in the storage arrangement 32. If the digital information packet has not been received the subroutine 500 loops at the query command 506 until the packet is received.

Once the digital information packet has been stored, the system advances to a command step 510 to authenticate that an uncorrupted file has been received. In this regard, the confirmation authentication system compares the GPS time and coordinate location information with the GPS time and coordinate information obtained from the authenticate subroutine 420. If there is no authentication, the subroutine advances from a query step 512 to the command step 522 to cause a warning message to be sent to the user of the mobile input device 14 and to the client's computer system 50. If the digital packet or digital file is authenticated, the subroutine 500 goes to a query command 514 to determine whether the user has sent a done command indicating that the user has completed gathering the necessary digital information from the destination location. If the done signal has not been received, the subroutine 500 returns to query command step 506 and proceeds as described previously.

If the done command is received, the subroutine 500 advances to a return command step 516, that causes the chain of custody program 100 to advance to the call command 212 that will be described hereinafter in greater detail.

Considering now the send warning command 522, if the user of the mobile input unit 14, does not stay within the vicinity of the destination location, the capture subroutine 500 will cause a warning to be sent to the client computer system 50 and to the user. In this regard, after the warning is sent the subroutine advances to the query step 206 where the program proceeds as previously described.

5. The Organize Subroutine

The organize subroutine 600 begins at a start command 602 in response to the call command 212 and advances to a command step 604. The command step 604 organizes the file data sequences segregating them by subscriber and sequence number. The segregated and sequenced files are then stored in the storage arrangement for subsequent retrieval whenever a customer (user or subscriber) logs into the chain of custody system 10. The organize subroutine 600 advances from the organize command 604 to the query step 214, where the program proceeds as previously described.

6. The Retrieve Subroutine

The retrieve subroutine 700 is executed whenever a client subscriber desires to retrieve digital information or chain of custody information stored in the chain of custody system 10. In this regard, the retrieve subroutine 700 is started whenever the chain of custody system 10 is initialized by advancing from a start command 702 to a query step 704.

The query step 704 determines whether a subscriber/customer logs onto a secure web site related to the chain of custody system 10. If the chain of custody system 10 has not received a log on request, the program advances to a query command 707 to determine whether a power down signal has been received by the system 10. If a power down signal has been received, the program proceeds to an end command 709 that causes the system 10 to power down. Alternatively, if no power down signal is received, the program returns to the query command 704 and proceeds as described previously.

If a log in request is received at query step 704, the subroutine 700 advances to a query command 706 to determine whether the customer log in request was received from a subscriber. In this regard, each subscriber is given a unique log in identification number, which also functions as a decryption key as will be explained hereinafter in greater detail.

If the log in request was not received from a subscriber, the subroutine 700 proceeds to a command step 720 in order to send a non-subscriber message to the person who generated the customer log in request. The subroutine 700 then goes to the query step 704 where the subroutine proceeds as described previously.

If the log in request was received from a subscriber, the subroutine 700 proceeds to a query step 708 to determine whether the subscriber is requesting to view, download, print or order a certified or uncertified reproduction generated by a specific input unit. In this regard, if an image request is received, the subroutine 700 advances to a call command 711 that causes a reproduction subroutine 800 (FIG. 8) to be executed. The reproduction subroutine 800 will be described hereinafter in greater detail.

After the image subroutine 800 has been executed, the subroutine 700 continues to a log out query command 712 to determine whether the subscriber has completed the transaction with the chain of custody system 10. In this regard, if the subscriber has completed the transaction with the chain of custody system 10, the subroutine 700 goes to the query step 704 where the subroutine 700 continues as described previously.

If the subscriber has not completed the transaction with the chain of custody system 10, the subroutine 700 proceeds to query step 707 to verify that the system 10 is still available for transaction work. The subroutine 700 proceeds from query step 707 as described previously.

Considering again the request step 708 in greater detail with reference to FIG. 7, if the subscriber has not made an image request, the subroutine 700 goes to a query command 710 to determine whether the subscriber has made a chain of custody request. If the subscriber has made a chain of custody request, the subroutine 700 advances to a call reproduction command step 715. The call command 715 causes the reproduction subroutine 800 to be executed. After the reproduction subroutine 800 has been executed, the subroutine 700 proceeds to the log out query step 712 where the subroutine proceeds as described previously.

If the subscriber has not made a chain of custody request, the subroutine 700 proceeds to a query command 712 to determine whether the subscriber has made a log out request. If the subscriber has made a log out request, the subroutine 700 advances to the command step 704 where the subroutine proceeds as described previously. On the other hand, if the subscriber has not made a log out request, the subroutine 700 goes to the query step 707 and proceeds as described previously.

7. The Reproduction Subroutine

Figure 8:
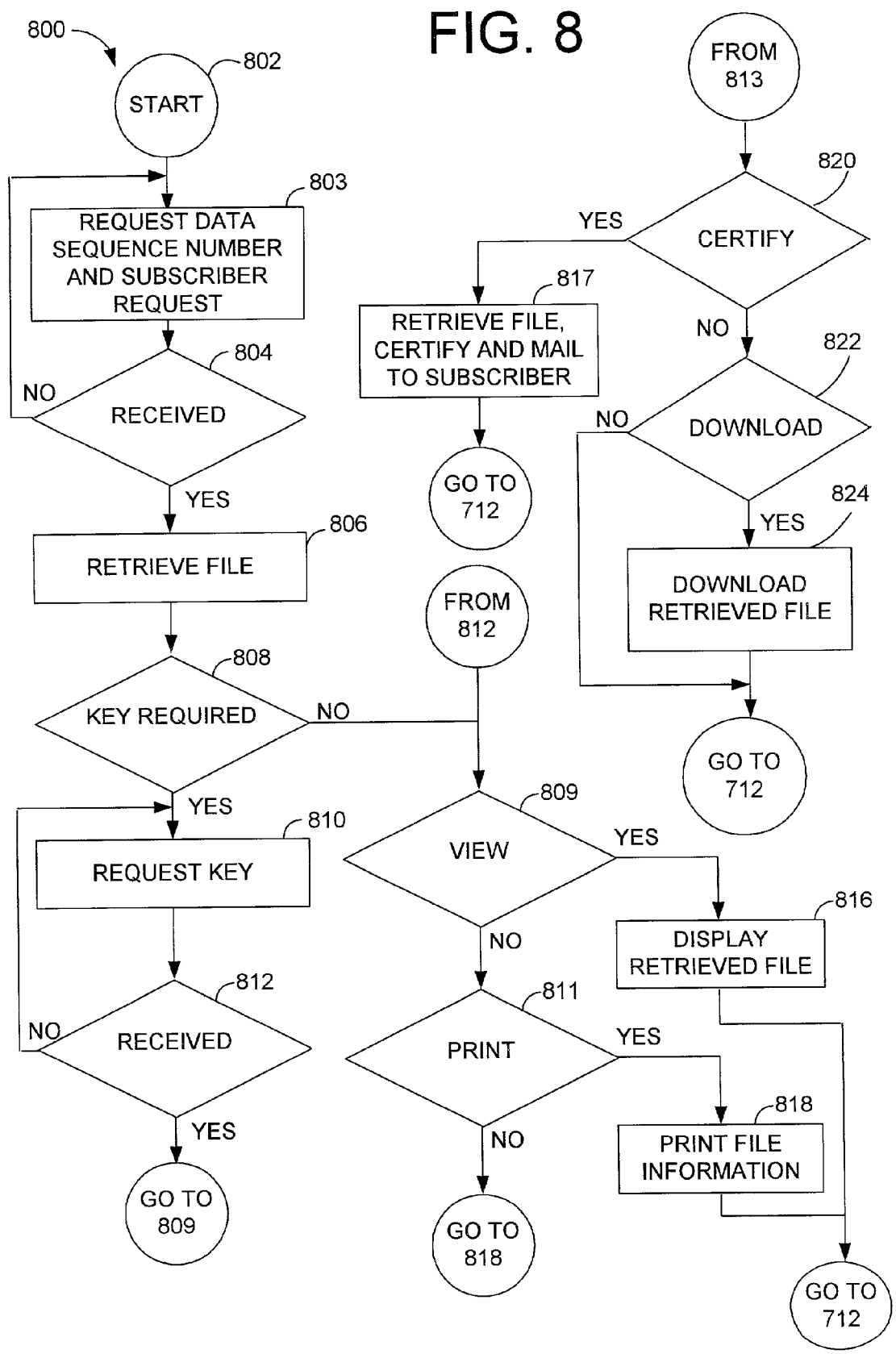
FIG. 8 is a high-level flow chart of a reproduction subroutine executed whenever a client subscriber desires to reproduce a chain of a custody file stored in the chain of custody system of FIG. 1.

Considering now the reproduction subroutine 800 in greater detail with reference to FIG. 8, the reproduction subroutine 800 begins at a start command 802 and proceeds to a command step 803. The command step 803 causes the confirmation authentication system 30 to request a sequence number from the customer/subscriber along with the necessary details to fulfill the request of the subscriber.

Once the request has been made to the customer/subscriber, the subroutine 800 goes to a query command 804 to determine the customer/subscriber has supplied the requested information. If not, the subroutine 800 returns to command step 803 to make another request.

If the customer/subscriber has provided the requested information, the subroutine 800 advances to a command step 806 to cause a subscriber identified file to be retrieved from the storage arrangement 32. The subroutine 800 then goes to a query command 808 to determine whether the customer/subscriber must provide an encryption key in order to access the requested file.

If an encryption key is required, the subroutine 800 proceeds to a command step 810 that causes a request to be generated and transmitted to the customer/subscriber. Next, the subroutine 800 goes to a query command 812 to determine whether the subscriber has provided the necessary encryption key information.

If the subscriber has not provided the necessary key information, the subroutine 800 goes back to the command step 810 and proceeds as described previously. Alternatively, if the subscriber has provided the key information, the subroutine 800 advances to a query command 809.

The query command 809 causes the confirmation authentication system 30 to determine from the subscriber supplied information, whether the subscriber has requested to merely view the file information. In this regard, if the subscriber has requested to view the file information, the subroutine 800 advances to a display command step 816. The display command step 816 causes the retrieved file to be displayed (on means not shown) for viewing by the subscriber. After the system has displayed the file for viewing by the subscriber, the subroutine 800 proceeds to the query command 712 (FIG.7) and proceeds as described previously.

If the subscriber has not requested to view the identified file, the subroutine 800 proceeds from query command 809 to a query command 811 to determine whether the subscriber has requested a hardcopy printout of the identified file. The subroutine 800 advances to a print command 818 if the subscriber desires a hardcopy of the file. In this regard, the hardcopy printout is generated by a local printer 34 and then supplied to the subscriber. Alternately, if the subscriber has a remote printer attached to the system, the hardcopy can be printed on the remote printer.

If a determination is made at query command 811 that the subscriber does not desire a hardcopy printout of the retrieved file, the subroutine advances to a query command 820 to determine whether the subroutine advances to a query command 822 if the user has not requested a certified copy of the retrieved file.

If a certified copy of the retrieved file has been requested, the subroutine 800 goes to a command step 817 that causes the requested file to be retrieved, certified and mailed to the subscriber. Thereafter the subroutine 800 goes to the query step 712 and proceeds as described previously.

At query step 822, a download determination is made, ie., did the subscriber request the file be downloaded? If so, the program advances to a command step 824 that causes the requested file to be downloaded to the subscriber. After the file has been downloaded to the subscriber, the subroutine advances to the query command 712 and proceeds as described previously.

If the subscriber did not request a download, the subroutine goes from query command 822 to the query step 712 and proceeds as described previously.

8. The Mobile Input Units

Considering now the mobile input units 14 and 140 in greater detail with reference to FIGS. 1 and 9, mobile input units 14 and 140 are substantially similar and accordingly, only mobile unit 14 will be described hereinafter in greater detail.

Figure 9:
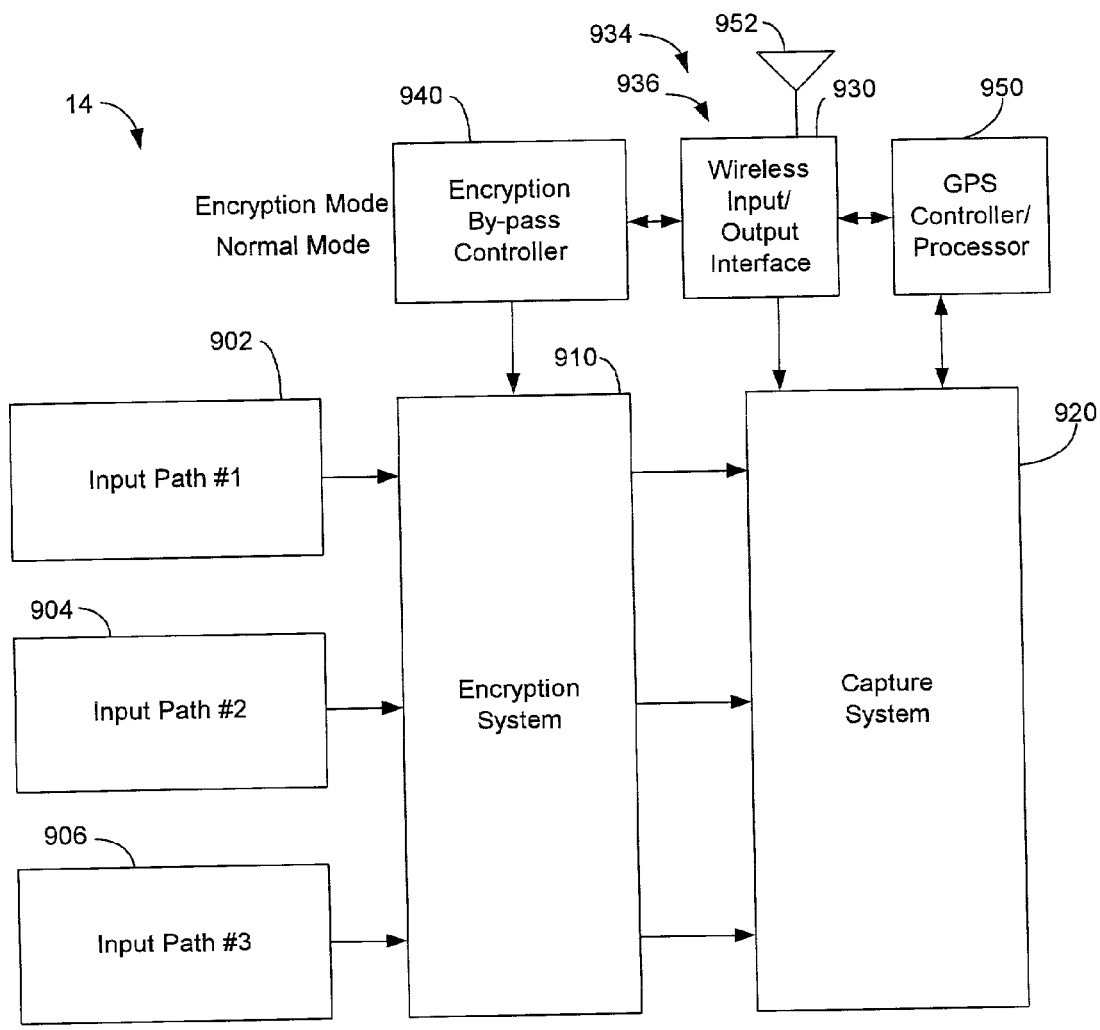
FIG. 9 is a block diagram of a mobile input unit of FIG.1.

As best seen in FIG. 9, the mobile unit 14 is a memoryless device that generally includes a plurality of input paths, such as input paths 902, 904, and 906. The input paths are indicative of different types of information that may be captured by the mobile input unit via its capture system 920. For example, input path 902 is a digital camera input to capture system 920. For example, input path 902 is a digital camera input to capture still digital images; input path 904 is a video camera input to capture video information; and input path 906 is a audio input to capture audio information. While, example inputs have been provided it is contemplated that other types and kinds of input paths can be provided. For example any device that captures digital information is contemplated. This would include infrared capture devices, chemical analyzing devices, etc.

In order to secure the captured information prior to compression and transmission to the chain of custody system 10, the mobile input unit 14 also includes an encryption system 910. The encryption system 910 is a conventional encryption system and will not be described hereinafter in greater detail. It will suffice to mention that different types of encryption methods are contemplated within the true scope and sprit of the present invention. Thus, for example, time varying encryption, watermark encryption, fingerprint encryption and retina pattern encryption are each considered to be within the scope of the present invention.

To enable wireless transmissions between the chain of custody system 10 and the mobile input unit 14, the mobile input unit 14 further includes a wireless input/output interface 930 that includes a satellite interface arrangement 934 and a modem interface arrangement 936. Since such interface arrangements are conventional, they will not be described hereinafter in greater detail. It will suffice to mention that the wireless input/output interface 930 permits the mobile input unit 14 to communicate with the chain of custody system 10 either using a cellular protocol when a cellular base unit, such as a cellular base unit 22 (FIG.1) is disposed in a reception area that enables cellular communications with the mobile input unit 14, or alternatively, using a satellite protocol when the mobile input unit is unable to make a cellular connection as illustrated with mobile unit 140.

Finally, as best seen in FIG. 9, the mobile input unit 14 also includes an encryption by-pass controller 940 and a GPS controller/processor 850. The encryption by-pass controller 940 operates in cooperation with the encryption system 910 and the capture system 920 to encrypt, compress, and transmit captured information on the fly. In this regard, all information captured by the mobile input unit 14 is encrypted and immediately transmitted to the chain of custody system 10 without storing the captured information in the mobile input unit 14. The GPS controller/processor 950 that is coupled to a satellite interface 952 enables the transmitted information to be time stamped and to be supplemented with geographic coordinate information to indicate the location of the mobile input device 14 when a particular object is captured. As GPS controller/processors and encryption by pass controller are conventional, neither the encryption by-pass controller 940 nor the GPS controller/processor 950 will be described hereinafter in greater detail. It should suffice to mention, that when power is applied to the mobile input unit 14, the mobile input unit 14 is initialized by acquiring GPS & time signals, establishing communication links with the chain of custody system 10 and the client computer system 50, and otherwise establishing a default mode of operation where the encryption by-pass controller operates in a normal mode as opposed to an encryption mode of operation.

9. The Communication Subroutine

Considering now the operation of the chain of custody system 10 in still greater detail with reference to FIG. 10, whenever power is applied to an input unit, such as the mobile input unit 14, the encryption by-pass controller 940 and the GPS controller/processor 950 begin cooperating with the encryption system 910 and the capture system 920 to commence communications with chain confirmation authentication system 30 and the client computer system 50 as will be explained hereinafter in greater detail. In this regard, a communications subroutine 1000 built into the firmware of the mobile input unit 14, is activated.

Figure 10A:
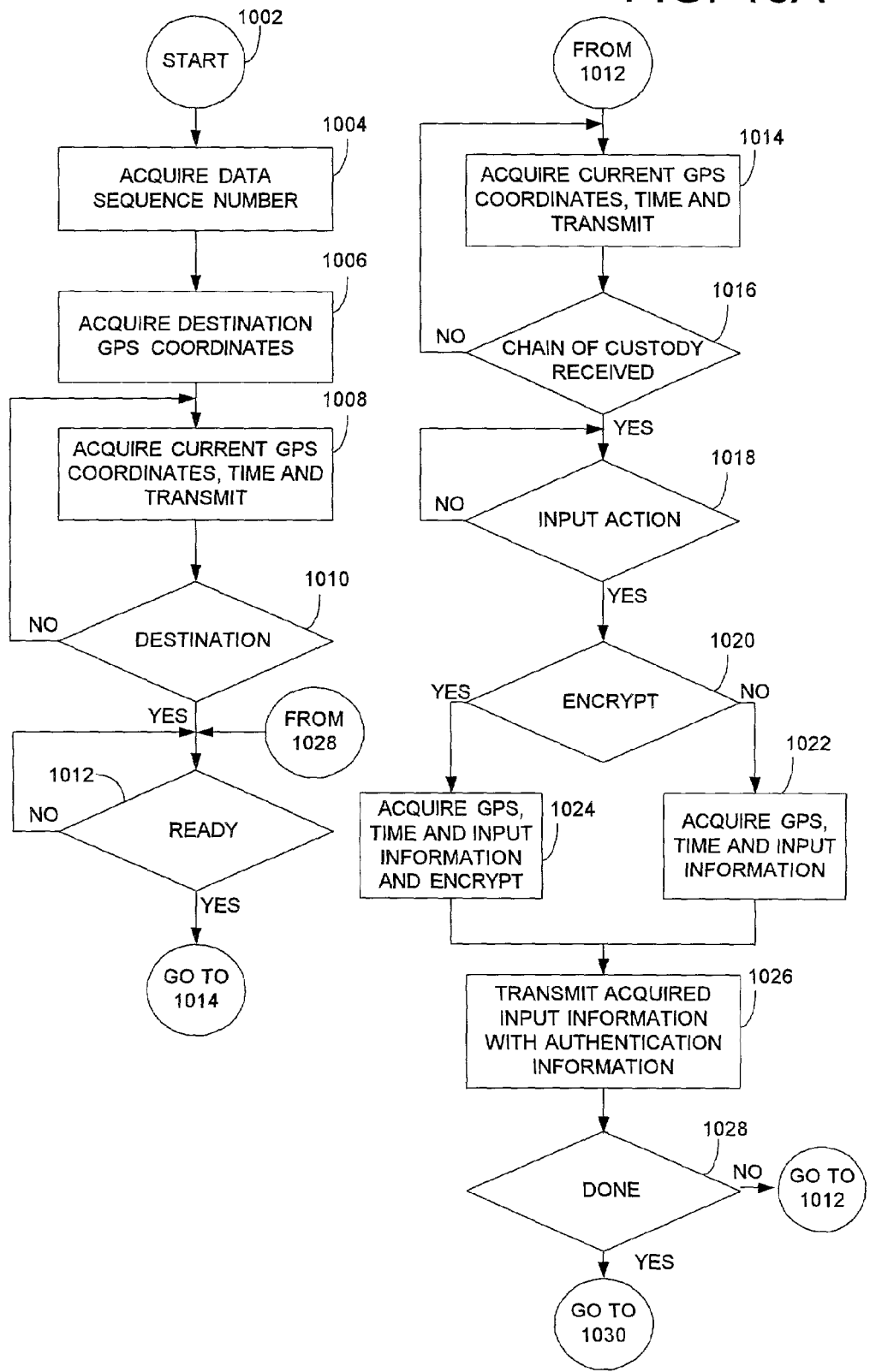
FIG. 10 is a high-level flow chart of the operational steps executed by the mobile input unit of FIG. 9.
Figure 10B:
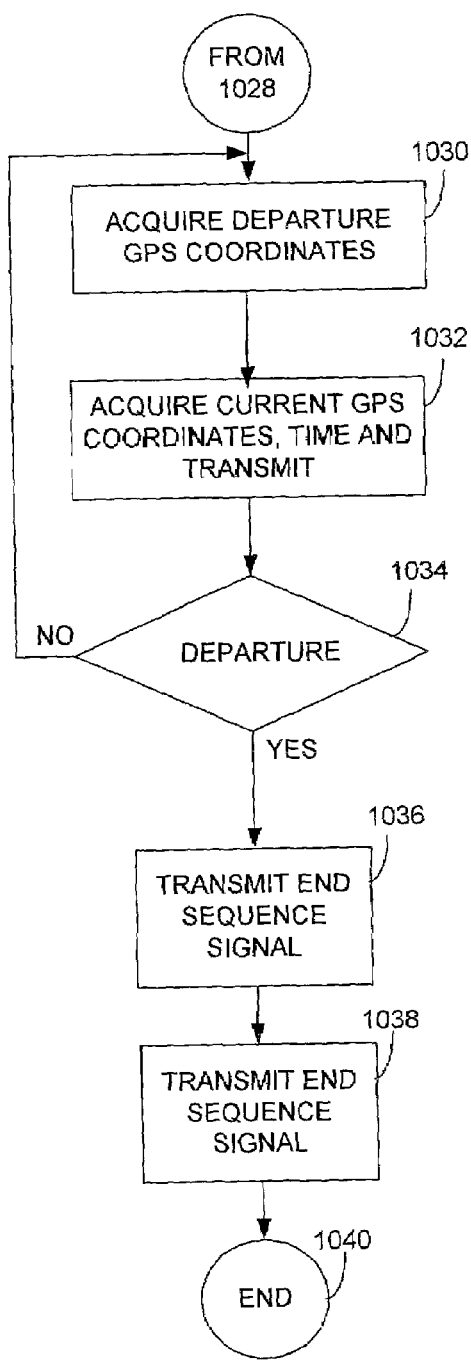
Figure 10:
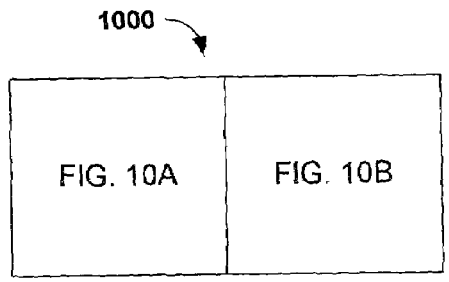

Considering now the communication subroutine 1000 in greater detail with reference to FIG. 10, when power is applied to the mobile input unit 14, the communication subroutine 1000 begins at a start command 1002 and proceeds to an acquisition command 1002. The acquisition command 1002 causes the encryption by-pass controller 940 to acquire the assigned data sequence number from the confirmation authentication system 30. The subroutine 1000 then goes to another acquisition command step 1006, which causes the GPS controller/processor 950 to acquire the destination GPS coordinates from the client computer system 50.

After the destination GPS coordinates are acquired, the subroutine 1000 proceeds to another acquisition command step 1008 to cause the GPS controller/processor to acquire the current GPS time coordinate information for the input unit 14, which is transmitted to the confirmation authentication system 30 and the client computer system 50. The subroutine 1000 then advances to a query command 1010 to determine whether the mobile input unit 14 has arrived at its predetermined destination GPS coordinate location. If the mobile input unit 14 has not arrived at its predetermined GPS coordinate location, the subroutine returns to command 1008 and proceeds as described previously. Alternatively, if the mobile input unit 14 has arrived at its destination location, the subroutine 1000 proceeds to a query command 1012 to wait for the user of the input system to provide an indication that he or she is ready to commence utilizing the input unit 14 for capturing information at the destination location.

It should be understood by those skilled in the art, that the confirmation authentication system 30 and the client computer system 50 will know that the mobile input unit has arrived at the destination GPS coordinate not only by the transmission of the GPS coordinate information, but also by the interruption in the transmission of GPS and time information from the mobile input unit 14. More particularly, there is an interruption in the GPS coordinate and time information when the subroutine 1000 advances to the query command 1012. The transmission of GPS coordinates and time information is resumed when the user provides an indication that he or she is ready to begin capturing information fat the destination location.

When the user is ready to begin capturing information at the destination location, the user actuates a ready switch 942 that allows the subroutine 1000 to advance from the query step 1012 to a command step 1014. The command step 1014 causes the GPS controller/processor 950 to once again acquire and transmit the current GPS coordinate and time information associated with the mobile input device. The subroutine 1000 then advances to a query command 1016 and waits for the confirmation authentication system 50 to send a chain of custody command signal to the mobile input unit 14. In this regard, the subroutine 1000 returns to step 1014 to provide updated coordinate information to the confirmation authentication system 30 and the client computer system 50. It should be understood by those skilled in the art that the confirmation authentication system 50 knows when to send the chain of custody command signal since the mobile input unit 14 will only begin to retransmit its current GPS coordinate information when the user of the input unit 14 is ready to begin a capture sequence.

When the confirmation authentication system 30 sends the chain of custody signal, the subroutine 1000 advances from the query step 1016 to a query step 1018 to determine whether the user has initiated an input action. The subroutine 1000 waits at the query step 1018 until such time as the user starts an input action.

Once the user of the mobile input unit 14 starts an input action, the subroutine proceeds to a query step to determine whether the encryption by-pass controller 940 is in an encryption mode of operation or a normal mode of operation. In this regard, if the controller 940 is in an encryption mode of operation, the subroutine 1000 goes to a command step 1024. Otherwise, the subroutine 1000 proceeds to a command step 1022.

At command step 1022, the subroutine 1000 causes the GPS controller 940 to acquire GPS and time information while the capture system 920 acquires input information via one or more of the input paths, such as the input paths 902, 904 and 906. The acquired input and GPS information or authentication information is immediately transmitted via a transmit command 1026 to the confirmation authentication system 30 and the client computer system 50. In short, the same information is transmitted to both systems to create duplicate records of the same information. Since there is no storage of the gathered input information at the mobile input unit 14, there is no opportunity for the user of the mobile input unit 14 to alter the input information.

Command step 1024 functions in the same manner as command step 1022 except the encryption system 910 is engaged to encrypt the input and GPS information prior to the information being transmitted at step 1026.

After the mobile unit information is transmitted, the subroutine 1000 advances to a query command 1028 to determine whether the user has completed the task of using the mobile input unit 14 for gathering input information at the destination location. In this regard, if the user is not completed, the subroutine returns to step 1028 to wait for the user to provide an indication that he or she is again ready to capture additional input information. Again it should be understood by those skilled in the art that the confirmation authentication system 30 will know that the user intends to continue capturing information since there will be another interruption in the transmission of GPS information. The subroutine 1000 proceeds from the query step 1012 as described previously.

If the user has completed capturing all of the necessary information at the destination location, the subroutine advances from the query step 1028 to command step 1030. Command step 1030 causes the mobile input unit 14 to acquire the departure GPS coordinate location from the client computer system 50. Once the departure GPS coordinate information has been acquired the subroutine 1000 advances to a command step 1031 and begins transmitting its current GPS coordinate and time. The subroutine proceeds to a query step 1034 to determine whether the current GPS coordinate information corresponds to the departure coordinate information. If not, the subroutine returns to step 1030 and proceeds as described previously. If the mobile unit has arrived at its departure GPS coordinate location, the mobile unit 14 transmits an end of sequence signal to the confirmation authentication system 30 and the client computer system 50 so that both systems know that the current sequence of data received from the mobile input unit 14 has been completed. After the end of sequence signal has been transmitted the subroutine 1000 goes to a power down command step 1038 that powers down the mobile input unit 14, which causes the subroutine to advance to an end command 1040.

From the foregoing it should be understood by those skilled in the art that the chain of custody system 10 is suitable for use in a business environment where the system 10 provides secure creation, chain of custody, storage and reproduction of any digital information media including digital photographic evidence. It is contemplated in a business method, that a service provider would provide a mobile input unit, such as a mobile input unit 14 to a subscriber customer. The mobile input unit 14 has the following features: 1) time and location stamping capability via a NIST atomic clock (not shown) and the GPS controller/processor 940 capability for unit tracking purposes; 2) image encryption capability via the encryption system 910 to prevent editing/tampering with the capture information; and 3) wireless transmission capability via the wireless interface arrangement 930 to send digital and analog information to the confirmation authentication system 30 for storage on a secure server. The present invention contemplates providing secure redundant servers for the retention of the received analog and digital information.

Subscriber/customers have the capability of logging on to the chain of custody system 10 and its secure server and then using a customer or subscriber identification number or password to view and download files. The service enabled through the chain of custody system 10 is absolutely secure, redundant and fraud proof.

It is contemplated that mobile input units can be leased, rented or sold along with a remote desktop printer to allow a subscriber/customer to print images for analysis and case preparation. The service contemplated enables a client subscriber to order a certified record that can be printed on a local printer 34 and mounted for court presentations. In short then, what has been disclosed is a business model for archiving and reproducing secure digital information using the chain of custody system 10. The value proposition applies to anyone who needs or wants digital information files as evidentiary items that are certifiable as being untampered with and secured in a verifiable chain of custody, record file. The mobile input unit 14 with Internet, cellular and GPS satellite capabilities allows the mobile input unit 14 to be utilized anywhere in the world.

The terms and expressions herein are used as terms of description and not of limitation, and there is no intension in the use of such terms and expressions of excluding equivalents of the features and steps shown and described, or portions thereof, it being recognized that various modifications are possible within the scope of the invention claimed. Thus, modifications and variations may be made to the disclosed embodiments without departing from the subject and spirit of the invention as defined in the following claims.

We claim:

1. An unimpeachable chain of custody method, comprising:
   providing a confirmation authentication system to facilitate the receiving and storing of a communication signal indicative of an evidentiary item captured at a determined location and at a determined time and to facilitate the generating and transmitting of a chain of custody confirmation signal that said communication signal has been authenticated and stored for subsequent retrieval; and
   providing a transportable input system having a positioning device and communication means to facilitate generating and transmitting in response to receiving said chain of custody confirmation signal, said communication signal and to facilitate generating an authentication signal that said communication signal was generated by said input system at about said determined location and at about said determined time.

2. An unimpeachable chain of custody method according to claim 1, further comprising:
   said input system being disabled from generating another communication signal until another chain of custody confirmation signal has been generated by said confirmation authentication system and received by said input system.

3. An unimpeachable chain of custody method according to claim 2, further comprising:
   providing an indication that said input system is enabled to generate said another communication signal.

4. An unimpeachable chain of custody method according to claim 2, further comprising:
   providing an indication that said input system is disabled from generating said another communication signal.

5. An unimpeachable chain of custody method according to claim 1, wherein said step of providing said transportable input system includes:
   enabling said input system to generate said communication signal for a predetermined chain of custody period of time; and
   disabling said input system from generating said another communication signal for another predetermined chain of custody period of time.

6. A chain of custody system, comprising:
   a confirmation authentication system for receiving and storing a communication signal indicative of an evidentiary item captured at a determined location and at a determined time;
   said confirmation authentication system further for generating and transmitting of a chain of custody confirmation signal that said communication signal has been authenticated and stored for subsequent retrieval; and
   a transportable input system having a positioning device and a communication device to facilitate generating and transmitting in response to receiving said chain of custody confirmation signal, said communication signal and to facilitate generating an authentication signal that said communication signal was generated by said input system at about said determined location and at about said determined time.

7. A chain of custody system according to claim 6, further comprising:
   a disabling arrangement for preventing said input system from generating another communication signal until another chain of custody confirmation signal has been generated by said confirmation authentication system and received by said input system.

8. A chain of custody system according to claim 7, further comprising:
   a device for providing an indication that said input system is enabled to generate said another communication signal.

9. A chain of custody system according to claim 6, wherein said transportable input system includes:
   an enabling arrangement to permit said input system to generate said communication signal for a predetermined chain of custody period of time; and
   a disabling arrangement to prevent said input system from generating another communication signal for another predetermined chain of custody period of time.

10. An unimpeachable chain of custody method, comprising:
   generating an information signal indicative of an evidentiary item captured at a determined location and at a determined time;
   transmitting said information signal to a remote confirmation system;
   generating a confirmation signal verifying that said information signal has been received and stored at said remote confirmation system; and
   responding to said information signal by generating an actuation signal to capture another evidentiary item at another determined location and at another determined time.

11. An unimpeachable chain of custody system, comprising:
   means for generating an information signal indicative of an evidentiary item captured at a determined location and at a determined time;
   means for transmitting said information signal to a remote confirmation system;
   means for generating a confirmation signal verifying that said information signal has been received and stored at said remote confirmation system; and
   means for responding to said confirmation signal by generating an actuation signal to capture another evidentiary item at another determined location and at another determined time.

12. A system for authenticating evidentiary items, comprising:
   a remote confirmation system for receiving and storing an uploaded digital signal indicative of an evidentiary item captured at a determined location at a determined time;
   said remote confirmation system generating and transmitting a verification signal that said uploaded digital signal has been received and stored; and
   an evidentiary transmission system responsive to said verification signal and a user activation signal for determining another capture location and another capture time of another evidentiary item and for uploading another digital signal to said remote confirmation system.

13. A system for authenticating evidentiary items according to claim 12, wherein said evidentiary transmission system includes:
   an input capture device for generating an information signal indicative of at least a portion of said uploaded digital signal.
   a position device responsive to the activation of said input device for determining the capture location and capture time of said evidentiary item; and
   wherein said remote confirmation system includes:
   a server for receiving and storing the uploaded digital signal; and
   another transmission device responsive to said server to facilitate providing said input device with said verification signal.

14. A system for authenticating evidentiary items according to claim 12, further comprising:
   a public access server for providing upon public request an unauthenticated hardcopy record of said evidentiary item; and
   a private access server for providing upon private request an unimpeachable hardcopy record indicative of said evidentiary item captured at said determined capture location and at said determined capture time.

* * * * *